(12) United States Patent
Englander et al.

(10) Patent No.: US 8,702,254 B1
(45) Date of Patent: Apr. 22, 2014

(54) MIRROR ADJUSTMENT MECHANISM

(75) Inventors: Benjamin Englander, Woodmere, NY (US); Julian Serer, Plainview, NY (US)

(73) Assignee: Rosco, Inc., Jamaica, NY (US)

(*) Notice: Subject to any disclaimer, the term of this patent is extended or adjusted under 35 U.S.C. 154(b) by 349 days.

(21) Appl. No.: 13/053,533

(22) Filed: Mar. 22, 2011

Related U.S. Application Data

(60) Provisional application No. 61/316,231, filed on Mar. 22, 2010.

(51) Int. Cl.
*G02B 7/182* (2006.01)
*B60R 1/072* (2006.01)
*B60R 1/00* (2006.01)

(52) U.S. Cl.
CPC ............. *B60R 1/072* (2013.01); *B60R 1/006* (2013.01)
USPC .......................... 359/876; 359/872; 359/877

(58) Field of Classification Search
USPC ........... 359/872, 876, 877; 248/479, 481, 482
See application file for complete search history.

(56) References Cited

U.S. PATENT DOCUMENTS

| | | | | |
|---|---|---|---|---|
| 5,363,246 A * | 11/1994 | Perry et al. | ...................... | 359/874 |
| 5,621,577 A * | 4/1997 | Lang et al. | ...................... | 359/872 |
| 7,572,020 B2 * | 8/2009 | Henion | ........................ | 359/876 |
| 7,798,659 B2 | 9/2010 | Englander | | |
| 8,210,696 B2 * | 7/2012 | Huang | ........................ | 359/872 |
| 2009/0009874 A1 | 1/2009 | Englander | | |
| 2009/0073590 A1 | 3/2009 | Englander | | |
| 2010/0079883 A1 | 4/2010 | Englander | | |

* cited by examiner

*Primary Examiner* — Alicia M Harrington
*Assistant Examiner* — Marin Pichler
(74) *Attorney, Agent, or Firm* — Stroock & Stroock & Lavin LLP

(57) ABSTRACT

An adjustable mirror mechanism includes a first connection section, a mirror lens carrier or support having a second connection section receiving and/or engaging the first connection section, and a mirror housing having a third connection section receiving and/or engaging the second connection section of the mirror lens carrier. The first connection section and/or the mirror lens carrier are fastened and/or secured to the mirror housing, and the mirror lens carrier is configured to receive a mirror lens. In some embodiments, the mirror lens carrier engages the rim of the mirror housing for added stability on one or more sides.

26 Claims, 10 Drawing Sheets

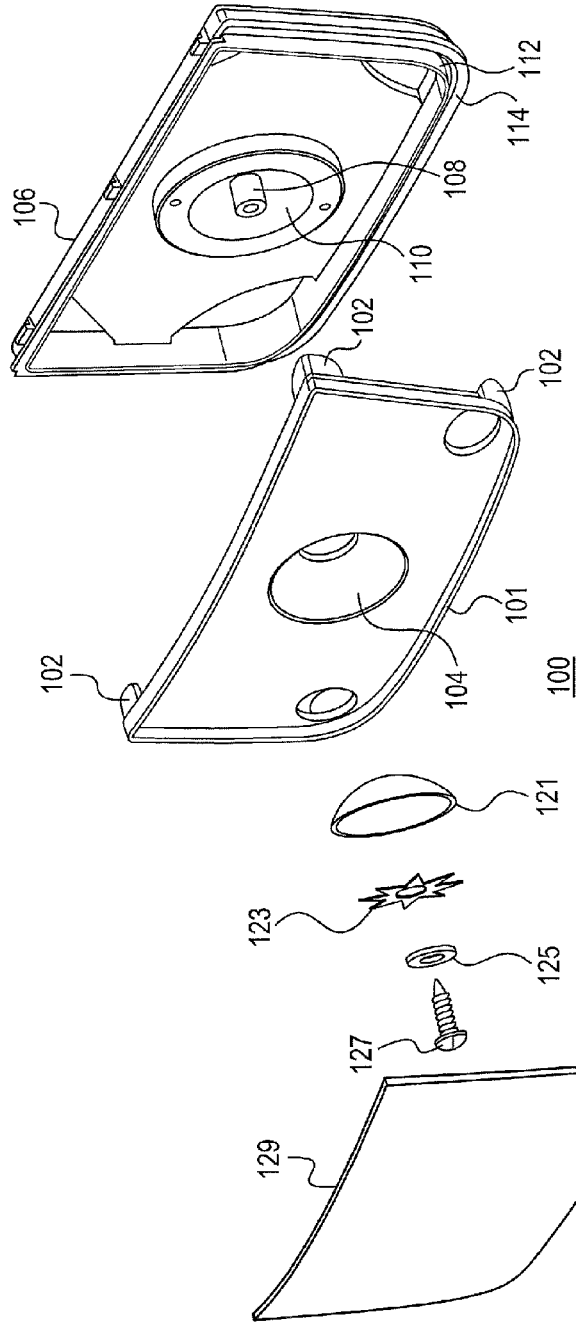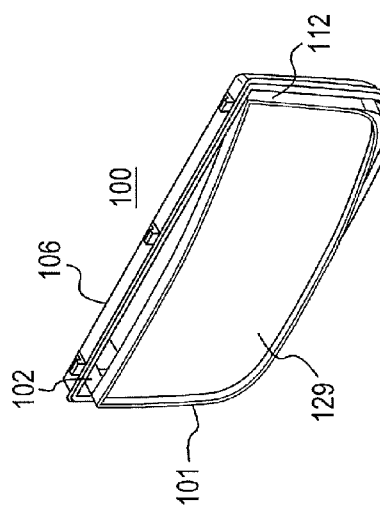

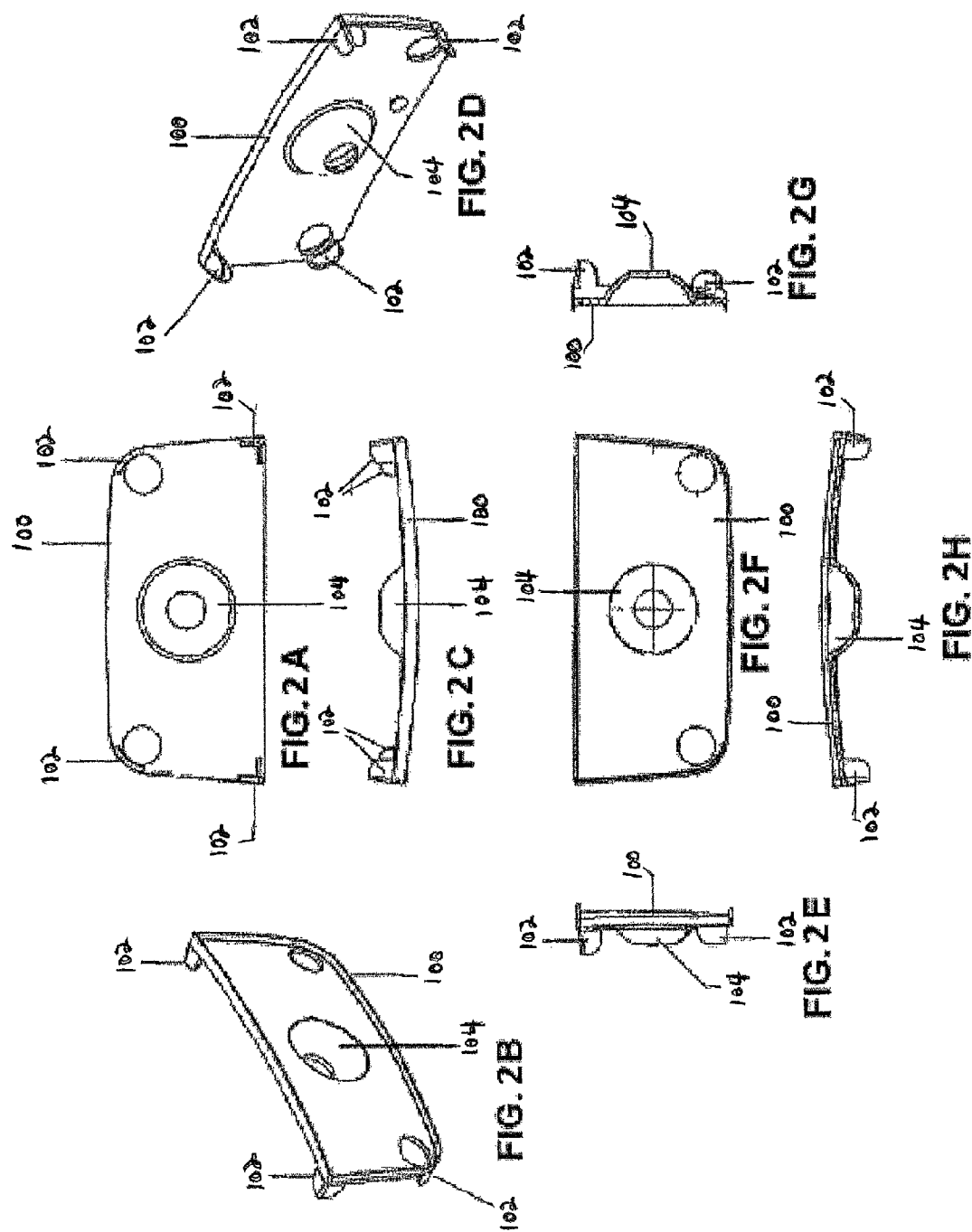

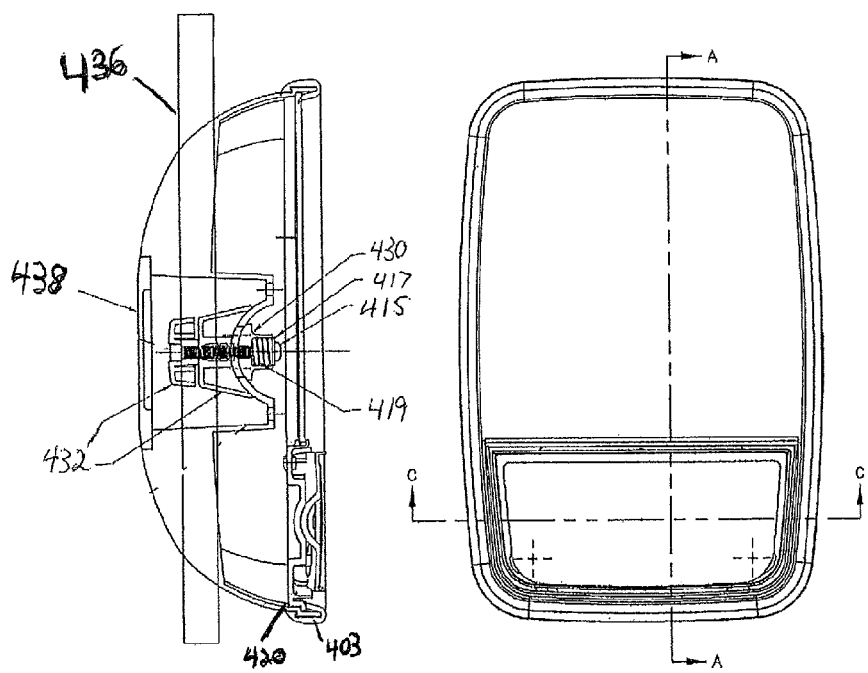
FIG. 5A
FIG. 5B
FIG. 5C
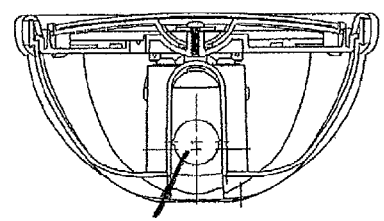
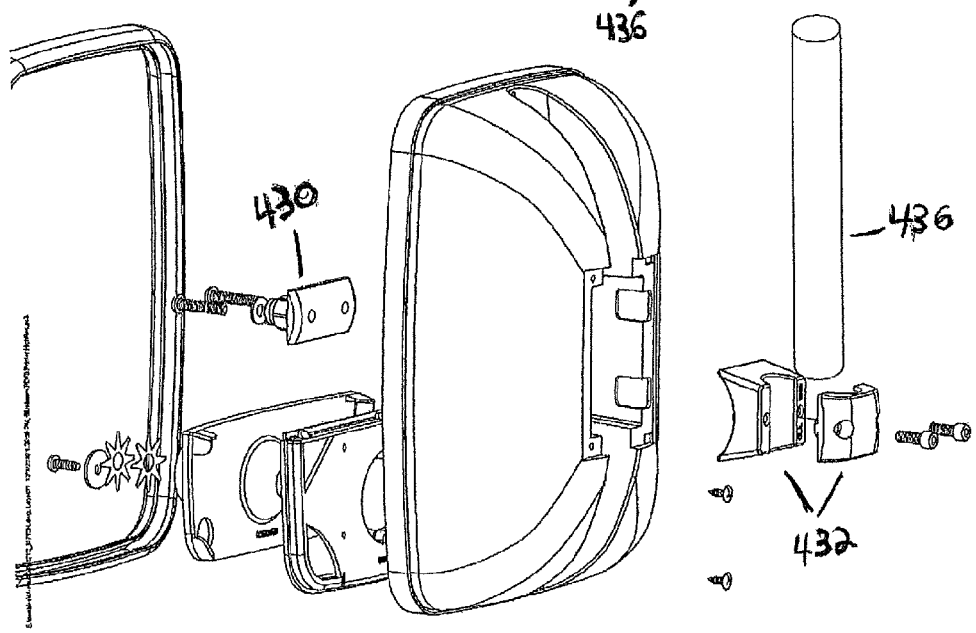
FIG. 5D

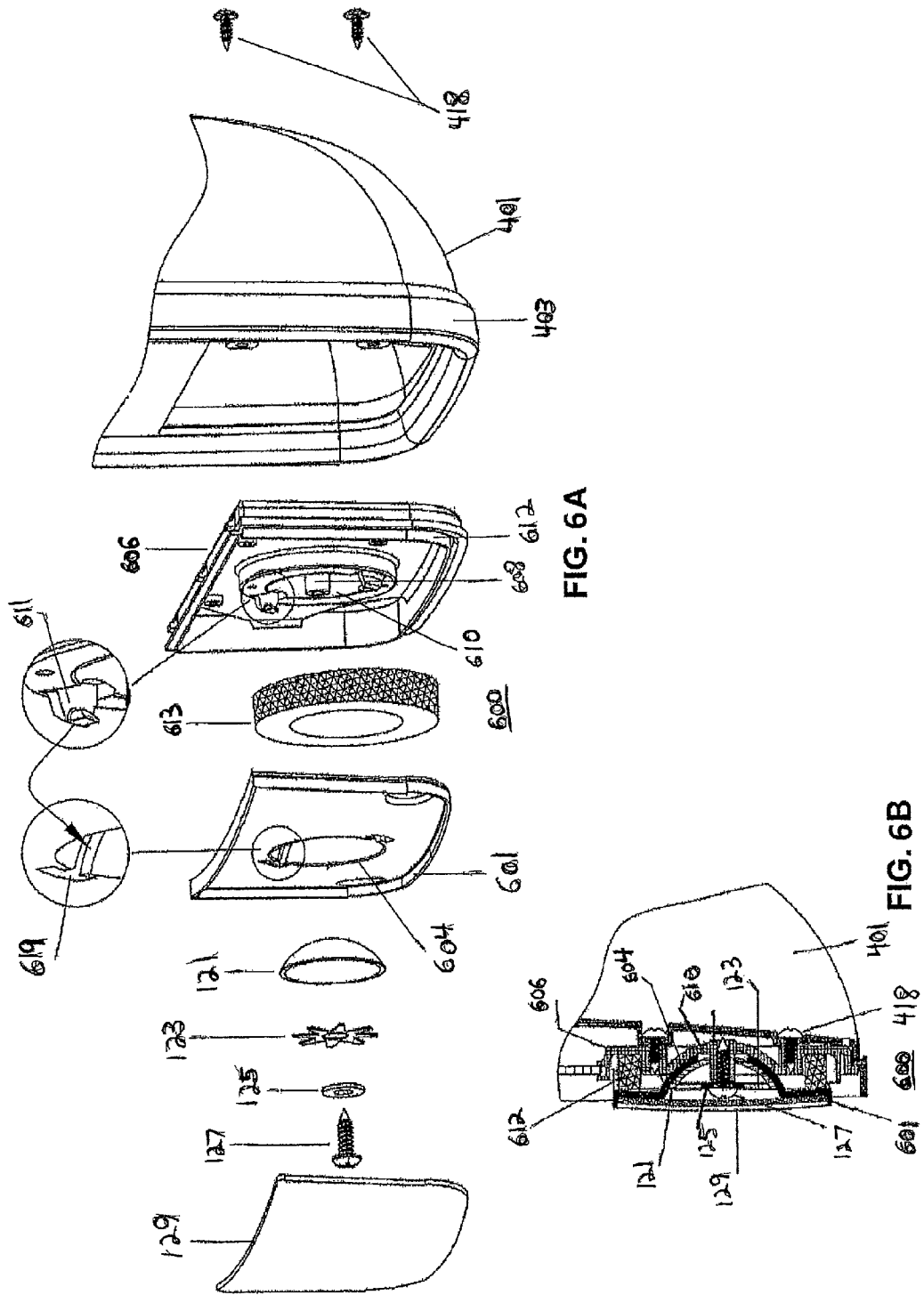

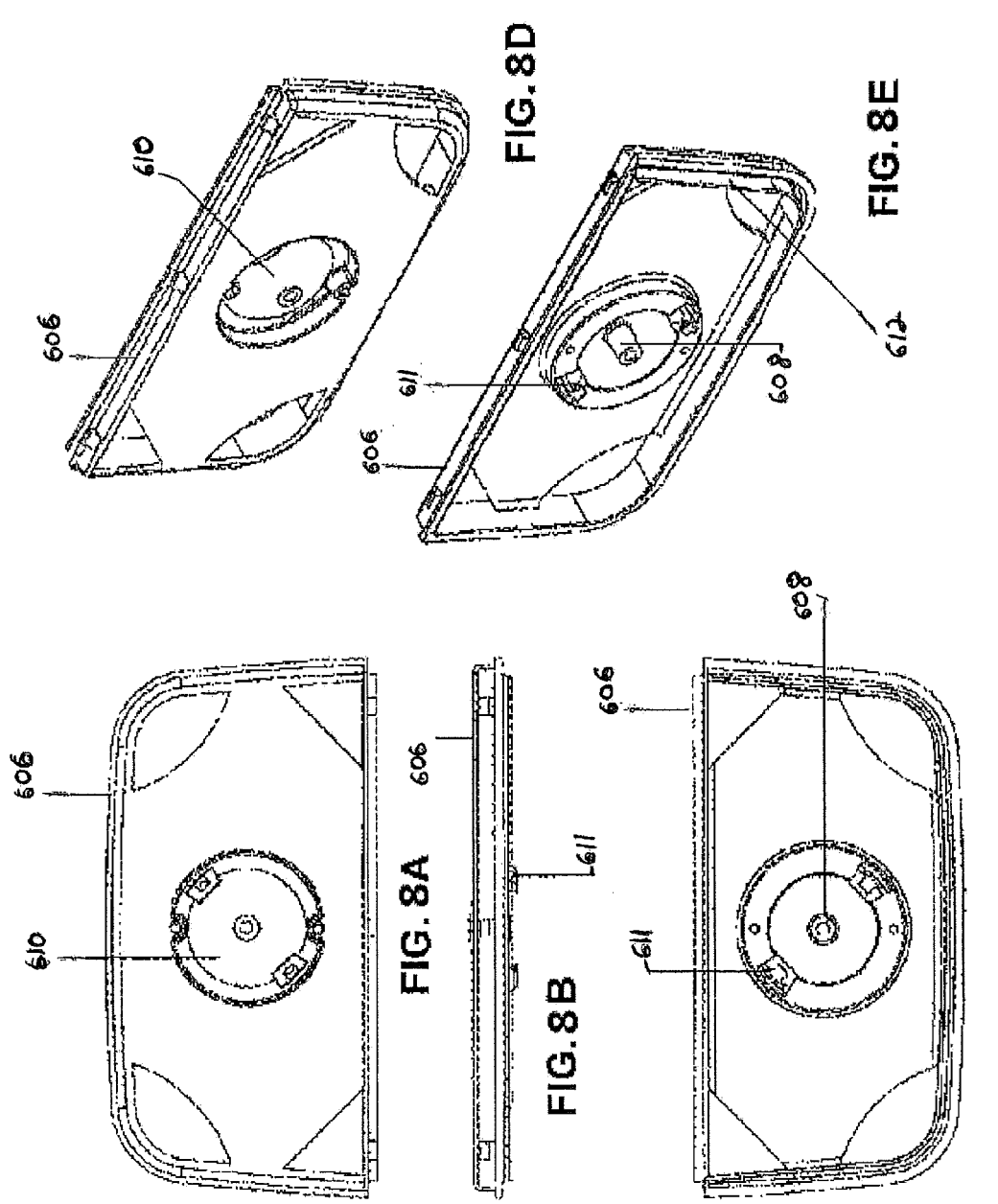

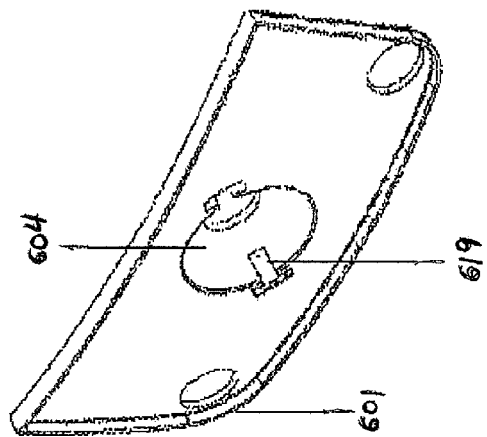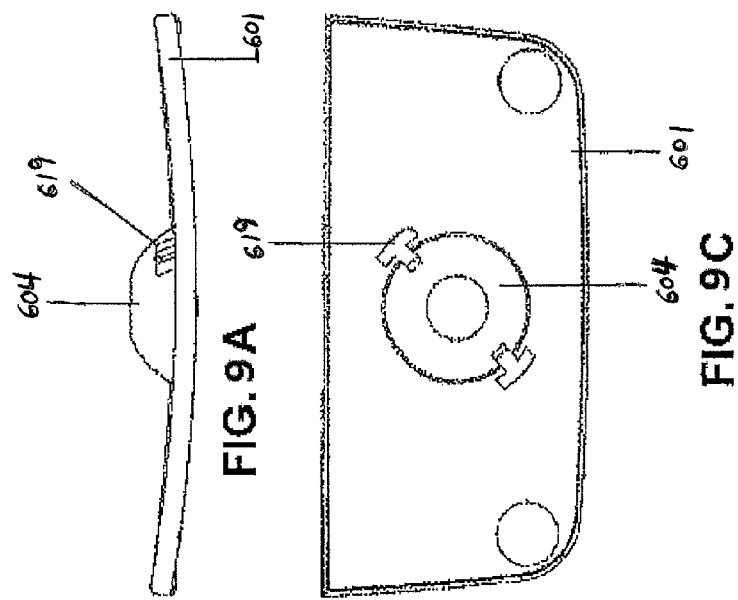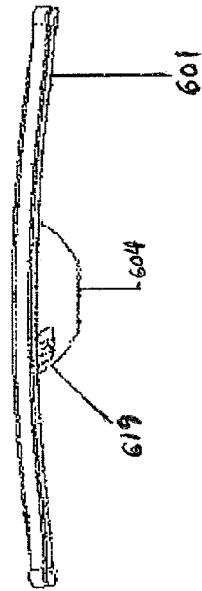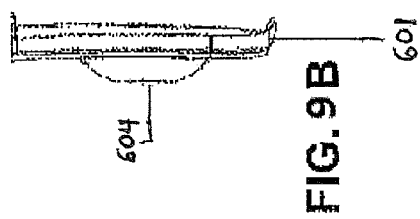

MIRROR ADJUSTMENT MECHANISM

CROSS-REFERENCE TO RELATED APPLICATIONS

This application claims benefit of U.S. Provisional Patent Application Ser. No. 61/316,231, filed on Mar. 22, 2010, which is hereby incorporated by reference herein in its entirety.

BACKGROUND

Most hand adjustable mirror assemblies use a distinct mechanical actuator that is installed inside the mirror head to pivot the mirror lens up or down or right or left. Such mechanical actuators, however, take up space within the mirror head, add complexity, and provide a source of malfunctions.

SUMMARY

Adjustable mirror assemblies and mirror units are provided. In one embodiment, a hand or manually adjustable mirror assembly is provided. The hand adjustable mirror assembly includes a first connection section, a mirror lens carrier or support having a second connection section receiving and/or engaging the first connection section, and a mirror housing having a third connection section receiving and/or engaging the second connection section of the mirror lens carrier. The first connection section and/or the mirror lens carrier are fastened and/or secured to the mirror housing and the mirror lens carrier is configured to receive a mirror lens. In some embodiments, the mirror lens carrier engages the rim of the mirror housing for added stability on one or more sides.

In another embodiment, a hand adjustable mirror unit is provided. The hand adjustable mirror unit includes a hemispherical cup, a mirror carrier having a first hemispherical cavity for receiving the hemispherical cup, and a support plate or support section having a second hemispherical cavity for receiving the first hemispherical cavity of the mirror carrier. The hemispherical cup and the mirror carrier are fastened to the support plate or support section and the mirror carrier is configured to receive a mirror lens. In one example of the hand adjustable mirror unit, the mirror unit also includes a gasket that is placed between the mirror carrier and the support plate or support section. In another example of the hand adjustable mirror unit, the support plate or support section is fastened to a mirror housing that is configured to receive more than one mirror unit.

In another embodiment, a method of assembling an adjustable mirror assembly is provided. The method includes the sequential, non-sequential and/or sequence independent steps of providing a mirror support having a first hemispherical cavity formed therein with an aperture, and a rib protruding a predetermined distance therefrom. A support plate or support section having a second hemispherical cavity, a connection post, and at least one receiving section is disposed to receive the rib, and the second hemispherical cavity receives the first spherical cavity of the mirror support. The method also frictionally and rotationally secures the mirror support to the support plate or support section by connecting to the connection post, and mounts a mirror lens on the mirror support over the at least one attachment device.

BRIEF DESCRIPTION OF THE DRAWINGS

FIGS. 1A and 1B illustrate an exploded view and an assembled view of an adjustable mirror assembly in accordance with one embodiment of the present invention.

FIGS. 2A-2H illustrate the mirror carrier shown in FIGS. 1A-1B seen from different perspectives in accordance with one embodiment of the present invention.

FIGS. 5A-5D illustrate the mirror housing and mirror assembly of the embodiment of FIG. 4 seen from different perspectives in accordance with one embodiment of the present invention.

FIGS. 6A-6B illustrate an actuator free, hand-adjustable mirror unit in accordance with one embodiment of the present invention.

FIGS. 8A-8E illustrate a support plate of the hand-adjustable mirror unit in FIGS. 6A-B seen from different perspectives in accordance with one embodiment of the present invention.

FIGS. 9A-9E illustrate a mirror carrier of the hand-adjustable mirror unit in FIGS. 6A-C seen from different perspectives in accordance with one embodiment of the present invention.

DETAILED DESCRIPTION

Figure 3B:
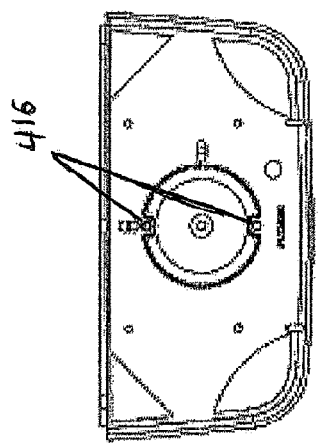
FIGS. 3A-3G illustrate an embodiment of the support plate of FIGS. 1A-1B seen from different perspectives in accordance with one embodiment of the present invention.
Figure 3G:
Figure 3C:

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated. For example, further insubstantial approximations of the process and/or algorithms are also considered within the scope of the processes described herein.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

Hand adjustable mirror assemblies and mirror units are provided. In some embodiments of the disclosed subject matter, mirror assemblies and mirror units are provided for hand adjustments of mirror lenses using hemispherical mirror adjustment mechanisms.

FIGS. 1A and 1B illustrate an actuator free, hand or manually-adjustable mirror assembly 100 including a mirror carrier or support 101 and a support plate or spine 106 in accordance with an embodiment of the present invention. The mirror carrier 101 includes a hemispherical cavity 104 and a set of ribs 102 that are located in each corner thereof. The support plate or support section 106 includes a post 108, a hemispherical cavity 110, and a peripheral rib 112.

The corner ribs 102 are used to prevent free mirror rotation beyond the inner boundary of the support plate or support section 106. At any given moment during an adjustment, for example, the corner ribs 102 are taller than the maximum gap between the support plate or support section 106 and the mirror carrier 101, thereby preventing free mirror rotations.

The mirror carrier 101 is fastened against the support plate or support section 106 by means of a screw 127, a star spring washer 123, a washer 125, and a hemispherical cup 121. A mirror lens 129 is fastened to mirror carrier 101, covering the screw 127, the star spring washer 123, the washer 125, and the hemispherical cup 121. The mirror carrier 101 and the support plate or support section 106 pair can be used for actuator free, hand-adjustable mirrors, such as the mirror unit 400 shown in FIGS. 4 and 5A-D.

The mirror carrier 101 is placed abutting support plate or support section 106 such that the concave portion of hemispherical cavity 110 of the support plate or support section 106 is in contact with or engages parts of the convex portion of hemispherical cavity 104 of the mirror carrier 101. The hemispherical cup 121 is then placed in hemispherical cavity 104 of mirror carrier 101. The hemispherical cup 121 and the mirror carrier 101 are then fastened to the support plate or support section 106 by means of the star spring washer 123, the washer 125, and the screw 127. In some embodiments, the support plate or support section 106 can be fastened to a mirror housing such as mirror housing 401 (shown in FIG. 4), which is in turn fastened to a mirror pole, such as the mirror pole 402 shown in FIGS. 5A and 5D, via a pressure mount 430 and bar clamp 432.

The star spring washer 123 is fastened to the support plate or support section post 108 against the hemispherical cup 121 via the washer 123 and the screw 127, such that the star spring washer 123 can exert uniform pressure against the hemispherical cup 121. The mirror lens 129 is then affixed to the front surface of the mirror carrier 101.

The hemispherical cup 121 loaded with the star spring washer 123 constrains the hemispherical cavity 104 of the mirror carrier 101 to the hemispherical cavity 108 of the support plate or support section 106 such that the friction between all hemispherical surfaces will keep the mirror carrier 101 in place, until an operator manually pushes the mirror lens 129 with a sufficient force to overcome the friction in order to adjust the position of the mirror carrier 101.

Advantageously, the hand-adjustable mirror assembly 100 shown in FIGS. 1A and 1B incorporates the components of the actuator as features of the mirror carrier 101, the support plate or support section 106, and the mirror housing 401, as described herein.

In alternative embodiments, cups, hemispherical cavities, cavities, openings, recesses and/or washers of different shapes and varying attachment mechanisms may be used to secure mirror carrier 101 to support plate 106, while maintaining the ability for mirror carrier 101 to be manually adjustable. In addition, alternative embodiments include different protruding shapes (e.g., varying hemispherical shapes and other protruding shapes), instead of hemispherical cavity 104 for rotating mirror carrier 101 within support plate 106. In alternative embodiments, the sections that are recessed may be shaped in the reverse manner to be of a protruding shape. Further, shapes that are circular and/or spherical-like may be modified to be of any suitable shape, indentation, protrusion, protuberance and/or recess. Alternative engagement mechanisms for the hemispherical cup and/or cavity sections for the mirror support and/or mirror plate may also be used, including the use of a ball and socket-like connection, ball bearings, protruding elements, and the like. In addition, the stoppage mechanism to prevent the mirror support from extending outwardly from, or inwardly into, the housing may include any standard protuberance and/or recess section on the mirror support and/or the support plate/support device.

In addition, while the embodiment shown in FIGS. 1A-1B discloses two washers 123, 125, a single washer or more than two washers of various types may alternatively be used. For example, more than one star spring washer 123 may be used to exert more pressure against the hemispherical cup 121. Further, the hemispherical cavity 104 may optionally include ridges, protrusions and/or indentations in the interior and/or exterior for added strength and/or resistive movement.

In alternative embodiments, the mirror housing 401 includes a plurality of mirrors that are manually adjustable in accordance with the present invention. Yet in other alternative embodiments, the mirror housing 401 may also include one or more motor actuated mechanisms, described herein in detail.

FIGS. 2A-2H show a set of illustrations of the mirror carrier 101 seen from different perspectives. The illustrations reveal the details of the mirror carrier 101 and unhindered views of its components (the corner ribs 102 and the spherical cavity 104).

Figure 3A:
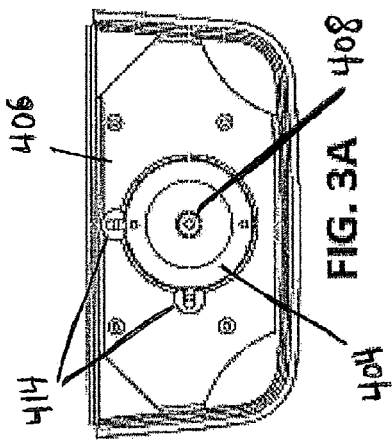
Figure 3D:
Figure 3F:
Figure 3E:
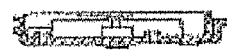
Figure 4:
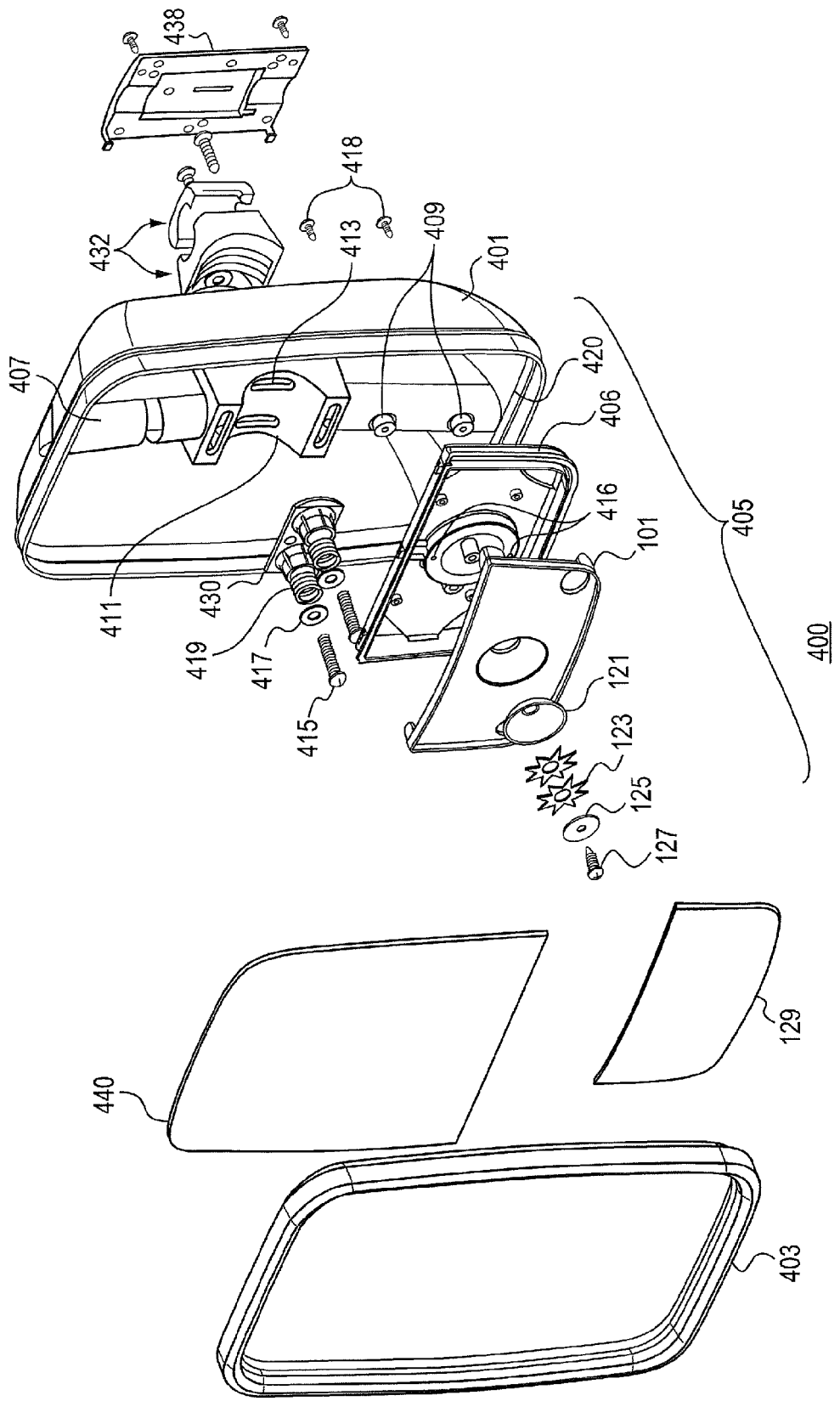
FIG. 4 illustrates an exploded view of a mirror assembly including a mirror housing containing a stationary mirror unit and a hand adjustable mirror unit in accordance with one embodiment of the present invention.

FIGS. 3A-3G show a set of illustrations of another optional embodiment of support plate 106, shown incorporated in mirror unit 400 of FIG. 4 as support plate 406, seen from different perspectives. The illustrations reveal the details of the support plate 406 and unhindered views of its components (a hemispherical cavity 404, a peripheral rib 412, and a post 408). FIG. 3A shows optional attachment apertures 414, which may receive one or more optional attachment devices (not shown) for holding in place a gasket such as gasket 613 shown in the alternative embodiment of FIG. 6A. As described in greater detail below, gasket 613 may be optionally included between the mirror carrier 101 and the support plate 106 to protect exposed friction surfaces in motion. FIG. 3B shows mounting apertures 416, to which mounting screws 418 (shown in FIG. 4) are connected, in order to attach a mirror assembly such as mirror assembly 100 to a mirror housing such as mirror housing 401 (shown in FIG. 4).

In other embodiments, a camera is provided in the manually adjustable mirror units and includes an accompanying cutout. A mounting hole provides an opening for the mirror pole to enter the housing, and an optional grommet is disposed in the mounting hole and prevents moisture, dirt and the like from entering the housing. Accordingly, one or more cameras may be advantageously affixed to one or more of the mirror supports and/or mounting plates in a location corresponding to one or more mirror cutouts.

Advantageously, as discussed below, when the mirror support and mirror are moved for viewing purposes, the camera attached thereto is simultaneously moved. Thus, separate controls to move the camera are not needed, and the viewing sight of the camera is advantageously adjusted in an efficient manner.

In alternative embodiments, a camera may be connected to the housing itself and/or the mirror mounting arms with its own manual or motor or adjustment device used for directing the view of the camera. According to another embodiment, the invention is provided with a first mirror unit that is substantially the same as described above and a second mirror unit that is replaced with a wide-angled camera to provide a field of view similar to the field of view of a convex mirror and/or other types of camera lenses. Further alternative embodiments include within a shell housing a single manually adjustable mirror or a plurality of manually adjustable mirrors and/or motor actuated mirrors in accordance with the various embodiments of the present invention.

In alternative embodiments, the mirror assembly 100 includes an adjustable mirror, such as the hand-adjustable mirror 600 (shown in FIG. 6A). Some of the alternative embodiments contemplated for the mirror unit 400, and mirror assembly 600 can be applied to the mirror assembly 100 without departing from the spirit and scope of the present invention.

FIG. 4 illustrates an exploded view of a mirror assembly 400 including a mirror housing 401 containing a stationary mirror unit 440 and an adjustable mirror unit (cutout 405) in accordance with an embodiment of the present invention. Mirror assembly 400 includes mirror carrier 102, support plate 406 (shown or alternative support plate configurations described herein, including support plate 106), and mirror lens 129, which are secured within or mounted to the lower portion of mirror housing 401. Mirror assembly 400 also includes stationary mirror unit 440, which is mounted to the upper portion of mirror housing 401. In alternative embodiments, stationary mirror unit 440 may be optionally mounted to the lower portion of mirror housing 401, and while adjustable mirror unit 405 may be mounted above. Furthermore, mirror housing 401 may be oriented along a horizontal axis, thus positioning stationary mirror unit 440 and adjustable mirror unit 405 side-by-side. In alternative embodiments, different shaped mirrors and/or housings may optionally be used.

Mirror housing 401 has a substantially rectangular shaped opening and interior space. Mirror housing 401 also includes an indented or molded spine 407 running vertically through the back portion of the mirror housing body providing additional support for the housing, as well as the mirror plate 406 and/or the mirror 440 along the rim of the housing as well as the optional rectangular mirror supports on opposite sides of pressure mount 430. Indented or molded spine 407 functions both to allow attachment of adjustable mirror unit 405 to the mirror housing 401, and to allow mounting of mirror housing 401 to a mirror, such as mirror pole 436 (shown in FIGS. 5A and 5D). Indented or molded spine 407 includes mirror support attachment apertures 409, which are substantially aligned with mounting apertures 416 of mirror support 406. Mounting screws 418 fasten to mounting apertures 416 of mirror support 406 via mirror support apertures 409. Alternative connection methods may be used, such as bolts, adhesive, locking/unlocking tabs, and the like.

In alternative embodiments, housing 401 may include an additional interior lip 420, projections (not shown) and/or stoppage barrier (not shown) that limits movement of mirror support 406 in one or more directions by engaging a mirror support lip such as mirror support lip 114 (shown in FIG. 1A), such that the mirror support rests at least partially against the interior lip 420 and/or other stoppage mechanism when the mirror assembly 100, 405 or 600 is mounted to mirror housing 401 as shown in FIG. 5A. Interior lip 420 may project along the entire inner portion of the mirror housing opening, or may be selectively located to engage the mirror support.

Indented or molded spine 407 further includes curved mounting section 411, which accepts or engages pressure mount 430 against its curved section, and contains oblong apertures 413. Pressure mount 430 has a curved side having a circumference substantially similar to the circumference of curved mounting section 411, and includes pressure mount screws 415, washers 417 and springs 419. Pressure mount 430 fastens mirror housing 401 to bar clamps 432 by connecting pressure mount screws 415, washer 417, and springs 419 to bar clamp 432 through oblong apertures 413. Springs 419 hold mirror housing 401 frictionally in place, which also allowing mirror housing 401 to be adjusted or tilted about the horizontal axis of pressure mount 430. As mirror housing 401 is tilted, curved mounting section 411 rotates axially about the curved side of pressure mount 430, while pressure mount screws 415 remain unobstructed, due to the oblong shape of oblong apertures 413. Alternative methods of connecting the mirror housing 401 to a mirror mounting arm may optionally be used, including one-piece clamps and/or standard bolt/screw connections.

In some embodiments, bar/arm clamp 432 suspends or secures mirror housing 401 outward horizontally so that mirror housing 401 is extended away from mirror pole 436, while mirror pole 436 is still partially engulfed or engaged by the concave side of indented or molded spine 407. Bar clamp 432 optionally acts as a fulcrum for mirror housing 401 to provide pivot and/or tilt capability depending on the connection between arm clamp 432 and mirror arm 436, for example, until the upper or lower edge of the inner portion of indented spine 407 is obstructed by mirror pole 436 or other stoppage mechanism to prevent further tilting.

In some embodiments, bar clamp 432 comprises an upper clamp portion and a lower clamp portion which are secured by screws around a mirror mounting arm/pole such as mirror aim 436. Bar clamp 432 can be optionally concealed and recessed within housing 401 using cover 438. An optional flexible rim or gasket 403 is mounted around the exterior opening of mirror housing 401 to both help secure stationary mirror unit 440 and adjustable mirror unit 405, and to limit exposure of internal parts prevents to water and/or dirt.

FIGS. 5A-5D show a set of views of the mirror unit 400 from different perspectives. FIGS. 5A-5D show the details of the mirror unit 400 and unhindered views of certain components (the pressure mount 430 and the bar/arm clamp 432). FIG. 5A illustrates a cut-away profile view of mirror unit 400 as viewed along the plane of line A of FIG. 5B. FIG. 5C illustrates a cut-away view seen from above of mirror unit 400, as viewed along the plane of line C of FIG. 5B. Molded housing section 407 includes curved mounting section 411 which engages pressure mount 430. Pressure mount 430 includes a section shaped to engage mounting section 411. Pressure mount 430 includes pressure mount screws 415, washers 417 and springs 419. Pressure mount 430 fastens mirror housing 401 to mirror arm clamps 432 by engaging pressure mount screws 415, washer 417, and springs 419 to mirror arm clamp 432 through apertures 413. Optional springs 419 provide a frictional bias which allows mirror housing 401 to be adjustable with respect to pressure mount 430. Alternative methods of connecting the mirror housing 401 to a mirror mounting arm may optionally be used, including one-piece clamps and/or standard bolt/screw connections.

FIGS. 6A-6B illustrate an actuator free, hand-adjustable mirror unit 600 in accordance with another optional embodiment of the present invention. FIG. 6B illustrates a vertical cross section of the hand-adjustable mirror unit 600. The hand-adjustable mirror unit 600 includes a support plate 606, a foam gasket 613, a mirror carrier 601, a hemispherical cup 121, a star spring washer 123, a washer 125, a screw 127, and a mirror lens 129. The support plate 606 in turn includes a peripheral rib 612, a hemispherical cavity 610, a post 608, and a set of guiding fingers 611. The mirror carrier 601 includes a hemispherical cavity 604 and a set of radial grooves 619. In alternative embodiments, different shaped components, connection devices and materials (e.g., the gasket can be of materials other than foam) and/or different number of components (e.g., one washer, three washers, no washers, no post, and the like).

The support plate 606 is fastened to the mirror housing 401 with a flexible rim 403 by means of a set of the screws 418. The mirror carrier 601 is fastened against the support plate 606 by means of the screw 127, the star spring washer 123, the washer 125, and the hemispherical cup 121. The mirror lens 129 is affixed to the fastened mirror carrier 601. The foam gasket 613 is placed between the mirror carrier 601 and the support plate 606.

The guiding fingers 611 on the support plate 606 are made to slide inside the radial grooves 619 in the mirror carrier 601 to prevent free rotation of the mirror carrier 601 about a horizontal axis. The contact surface between the hemispherical cup 121, the mirror carrier 601, and the support plate 606 is spherical.

Figure 7B:
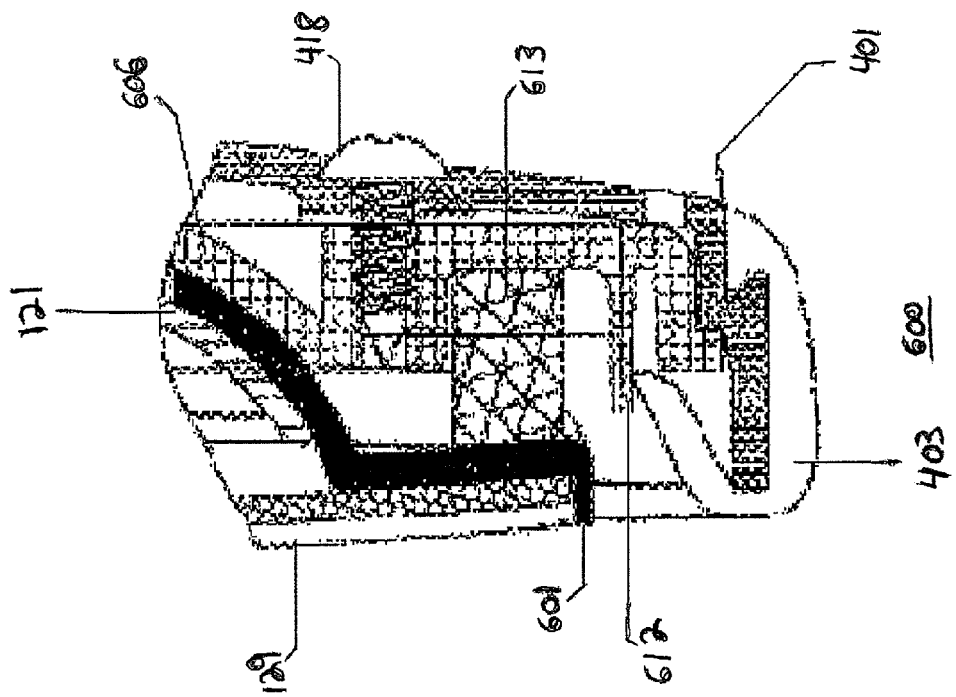
FIGS. 7A-7B illustrate a vertical cross section of a hand-adjustable mirror unit and a partial cross section of a hand-adjustable mirror unit in accordance with one embodiment of the present invention.
Figure 7A:
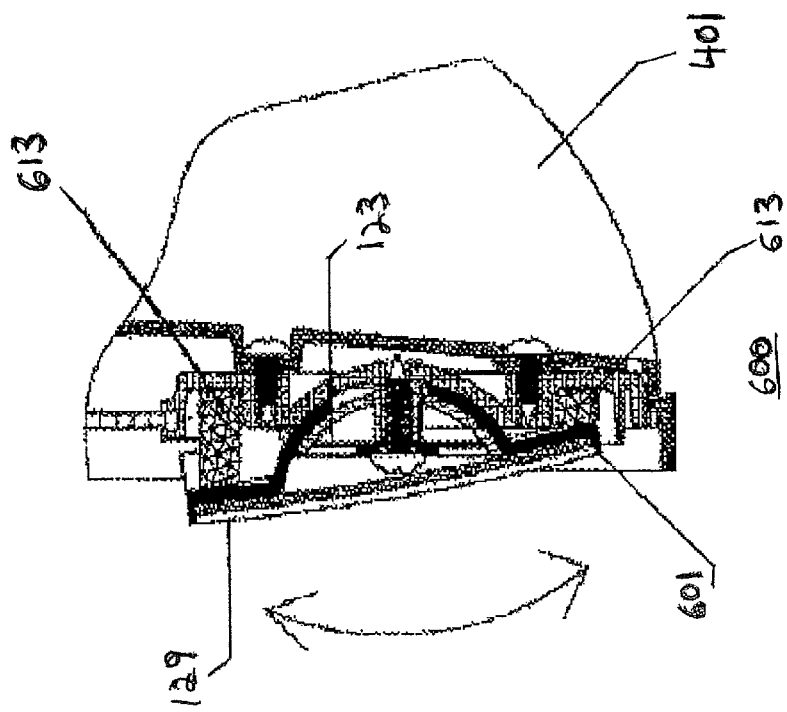

FIG. 7 shows a vertical cross section of the mirror unit 600 to illustrate, among other things, how the foam gasket 613 in the mirror assembly 600 interacts with the mirror carrier 601 as the position of the mirror lens 129 is adjusted in accordance with some embodiments of the invention. Referring to FIG. 7A, the foam gasket 613 protects exposed friction surfaces in motion and prevents water and/or dirt from compromising the adjustment mechanism of the present invention.

Adjustment of the mirror lens 129 is carried out when the mirror lens 129 is pushed by a user with a sufficient force that can overcome the friction maintained by the star spring washer 123 and/or gasket 613. As the mirror lens 129 is adjusted, the mirror carrier 601 holding the mirror lens 129 applies varying amounts of force to different parts of the foam gasket 613. In FIG. 7A, for example, the lower parts of the foam gasket 613 are depressed from the neutral position whereas the upper parts of it are relatively inflated from the neutral position.

The foam gasket 613 is placed between the mirror carrier 601 and the support plate 606 such that no gap can be formed to let in water and/or dirt beyond the foam gasket 613 into the hemispherical cavity 610 of the support plate 606, or the space between the hemispherical cavity 610 and the hemispherical cavity 604 of the mirror carrier 601, at any time during a mirror adjustment operation. This also enables the foam gasket 613 to protect the exposed friction surfaces of the mirror carrier 601 in motion by maintaining a constant contact with at least parts of the friction surfaces.

The foam gasket 613 may comprise alternative materials to foam, such as rubber, or other materials that, when combined with the mirror carrier 601 and the support plate 606, would allow manual adjustment of the mirror lens 129, and therefore, is not required to be made of a compressive material.

FIG. 7A further illustrates up and down adjustment operations of the mirror assembly 600. The mirror carrier 601 is adjusted to an up-adjustment position when the operator applies sufficient force to an upper portion of the mirror lens 129. Likewise, the mirror carrier 601 is adjusted to a down-adjustment position when the operator applies sufficient force to a lower portion of the mirror lens 129.

Other operations of the mirror assembly 600, such as right, left, up-right, up-left, down-right, and down-left adjustment operations, can be performed in the similar vein by applying sufficient force to a right, left, upper-right, upper-left, lower-right, or lower-left portion of the mirror lens 129, respectively. Operation of mirror assembly 100 and mirror unit 400 is similar performed by applying force to mirror lens 129 in the manner described for operation of mirror assembly 600.

In alternative embodiments, housing 401 may include an additional interior lip 420, projections (not shown), or stoppage barrier (not shown) that limits movement of mirror carrier 406 in one or more directions by engaging a mirror support lip such as mirror support lip 114 (shown in FIG. 1A), such that the mirror carrier rests at least partially against the interior lip 420 when the mirror assembly such at mirror assembly 100 or 600 is mounted to mirror housing 401 as shown in FIG. 5A. The interior lip, according to various embodiments of the invention, advantageously provides additional support to the adjustable mirror assembly. In addition, connecting the adjustable mirror assembly to the housing in addition to, or instead of the interior lip, provides further support.

FIG. 7B shows a partial cross section of the mirror unit 600 to illustrate, among other things, the function of peripheral rib 612 of the support plate 606. Referring to FIG. 7B, the peripheral rib 612 of the support plate 606 is designed to prevent the flexible rim 403 of the mirror housing 401 from interfering with adjustment of the mirror lens 129. More specifically, the peripheral rib 612 prevents such interference by damming up the flexible rim 403 of the mirror housing 401 at a location close to the outer boundary of the support plate 606.

FIGS. 8A-8E show a set of illustrations of the support plate 606 seen from different perspectives in accordance with alternative embodiments of the invention. The illustrations reveal the details of the support plate 606 and unhindered views of its components (the hemispherical cavity 610, the peripheral rib 612, the guiding fingers 611, and the post 608).

FIGS. 9A-9E show a set of illustrations of the mirror carrier 601 seen from different perspectives in accordance with alternative embodiments of the invention. The illustrations reveal the details of the mirror carriers 601 and unhindered views of its components (the hemispherical cavity 604 and radial grooves 619).

Figure 10:
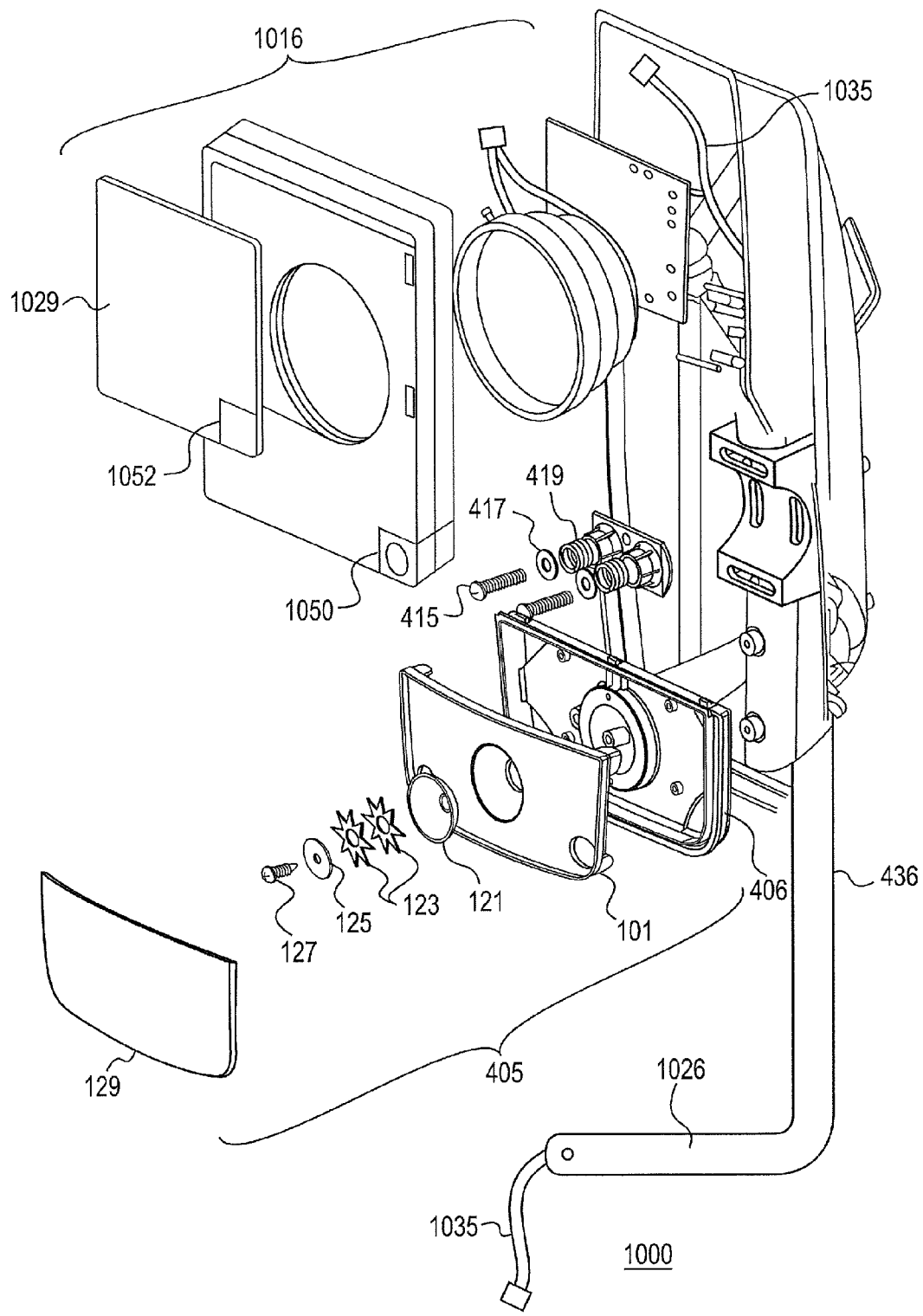
FIG. 10 illustrates an exploded view of a mirror assembly having motor actuated mirror units in accordance with one embodiment of the present invention.

FIG. 10 illustrates an exploded view of a mirror unit 1000 including a hand adjustable mirror assembly 405 and a motor actuated mirror unit, such as the motor actuated mirror unit 1016, in accordance with another embodiment of the present invention. The mirror unit 1000 includes mirror housing 401, within which mirror assembly 405 and motor actuated mirror unit 1016 are mounted. The mirror assembly 405 is fastened to mirror housing 401 as described in the description of FIG. 4.

Motor actuated mirror unit 1016 is mounted above mirror assembly. Alternatively, mirror housing 401 can be inverted so that mirror assembly 405 can be mounted above motor actuated mirror unit 1016. In alternative embodiments, the two mirror assemblies may include differently shaped mirror lens, such a convex mirror and a standard mirror for different viewing angles.

An electrical cable section (or harness) 1035 extends from a hinge member (not shown) for providing electrical connections between a motor control switch (not shown) and a motor (not shown) contained in mirror unit 1016. Mirror unit 1016 is mounted in mirror housing 401 such that the reflecting surface of second mirror 1029 lies substantially parallel to the plane of the opening of mirror housing 401.

Optionally, first cutout 1050 and second cutout 1052 are provided in a substrate or mounting plate 1081 and second mirror 1029, respectively, such that a camera may be positioned in-line with second mirror 1029 for viewing through the first and second cutouts. In various embodiments, similar cutouts of varying shapes may be provided in mirror lens 129, mirror carrier 101 and support plate 406 such that a camera may be positioned in-line with mirror lens 129 for viewing therethrough.

In other embodiments, separate cameras are provided in both mirror assembly 405 and motor actuated mirror unit 1016, as well as accompanying cutouts. The mirror pole 436 may further comprise additional support arms (not shown) to support arm 1026 each having a mounting hole 1021 on its distal end.

While FIG. 10 depicts one embodiment in which first cutout 1050 and second cutout 1052, and the associated camera, are disposed in a corner of mirror assembly 1016, the cutouts and camera may also or alternatively be disposed in different locations in motor actuated mirror unit 1016 and/or mirror assembly 405. Accordingly, one or more cameras may be advantageously affixed to one or more of the mirror supports and/or mounting plates in a location corresponding to the first and/or second cutouts as well as other locations.

In another embodiment, advantageously, as discussed below, when motor actuated mirror unit 1016 is moved using the motors for viewing purposes, the camera attached thereto is simultaneously moved. Thus, separate controls to move the camera are not needed, and the viewing sight of the camera is advantageously adjusted in an efficient manner.

In alternative embodiments, a camera may be connected to the mirror housing 401 itself, to mirror pole 436, and/or to one or more support arms 1026, with its own motor or adjustment device used for directing the view of the camera. According to another embodiment, the invention is provided with a first mirror unit that is substantially the same as described above and a second mirror unit that is replaced with a wide-angled camera to provide a field of view similar to the field of view of a convex mirror and/or other types of camera lenses.

According to other embodiments of the present invention, more than two mirrors are provided, each mirror providing a different field of view. Advantageously, a camera may be provided in any or all of the mirrors for providing a driver with multiple fields of view on a monitor within the vehicle.

In alternative embodiments, a camera may also be positioned in the upper or lower mirror carrier plate(s) as described in co-pending U.S. patent application Ser. No. 12/567,900, which is hereby incorporated by reference herein in its entirety. Further alternative embodiments include within an appropriately sized mirror housing a single manually adjustable mirror or a plurality of manually adjustable mirrors and/or motor actuated mirrors in accordance with the various embodiments of the present invention.

In alternative embodiments, a method of assembling an adjustable mirror assembly is provided. The method includes the sequential, non-sequential and/or sequence independent steps of providing a mirror support having an aperture, and a rib protruding a predetermined distance therefrom. A support plate having a second hemispherical cavity, a connection post, and at least one receiving section is disposed to receive the rib, and the second hemispherical cavity receives the first spherical cavity of the mirror support. The method also frictionally and rotationally secures the mirror support to the support plate by connecting to the connection post, and mounts a mirror lens on the mirror support over the at least one attachment device.

In alternative embodiments, a method of assembling an adjustable mirror assembly includes the sequential, non-sequential and/or sequence independent steps of providing a mirror support having a first hemispherical cavity formed therein and having a second aperture, and at least one rib protruding a predetermined distance therefrom. The method also includes disposing a support plate having a second hemispherical cavity, a connection post, and at least one receiving section to receive the at least one rib, and engaging the second hemispherical cavity to receive the first spherical cavity of said mirror support. In addition, the method includes securing, using at least one attachment device, the mirror support to said support plate by connecting to the connection post, and mounting a mirror lens on said mirror support over the at least one attachment device.

The adjustment mirror mechanism of the present invention is not limited in its application to the details of construction and to the arrangements of the components set forth in the description or illustrated in the drawings. The invention is capable of other embodiments and of being practiced and carried out in various ways. Also, it is to be understood that the phraseology and terminology employed herein are for the purpose of description and should not be regarded as limiting. Moreover, certain features which are well known in the art are not described in detail in order to avoid complication of the subject matter of the present invention.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps and/or functions described herein is not to be considered implying a specific sequence of steps to perform the process. Other alterations or modifications of the above processes are also contemplated.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

Further, it will be understood that the word mirror refers to any optical apparatus (e.g., mirrors, reflectors, signs, camera domes, other optically sensitive applications, etc.).

Although the present invention has been described and illustrated in the foregoing exemplary embodiments, it is understood that the present disclosure has been made only by way of example, and that numerous changes in the details of implementation of the invention may be made without departing from the spirit and scope of the invention.

We claim:

1. An adjustable mirror assembly comprising:
a hemispherical cup including a first aperture;

a mirror support having a first hemispherical cavity formed therein and having a second aperture, and at least one rib protruding a predetermined distance therefrom, the first hemispherical cavity receiving said hemispherical cup;

a support plate having a second hemispherical cavity, a connection post having an attachment receiving aperture and protruding from the second hemispherical cavity, at least one receiving section to receive the at least one rib, and a peripheral rim, the second hemispherical cavity receiving the first hemispherical cavity of said mirror support;

at least one attachment device frictionally securing at least one washer to said hemispherical cup and frictionally and rotationally securing said mirror support to said support plate by connecting to the connection post; and a mirror lens configured to be mounted on said mirror support over said at least one attachment device.

2. The adjustable mirror assembly of claim 1, wherein the second hemispherical cavity is configured to engage parts of the first hemispherical cavity.

3. The adjustable mirror assembly of claim 1, further comprising a gasket wherein the gasket is placed between the mirror carrier support and the support plate.

4. The adjustable mirror assembly of claim 3, wherein the gasket includes one of a foam gasket and rubber gasket.

5. The adjustable mirror assembly of claim 3, wherein the mirror support includes a set of radial grooves and the support plate includes a set of guiding fingers and wherein the guiding fingers are configured to slide inside the radial grooves and to secure the gasket between the mirror support and the support plate.

6. The adjustable mirror assembly of claim 1, wherein the support plate is fastened to a mirror housing.

7. The adjustable mirror assembly of claim 6, wherein the support plate is fastened to the mirror housing at least one screw.

8. The adjustable mirror assembly of claim 6, wherein the housing comprises an inner housing rim, and wherein the inner housing rim engages the peripheral rim of the support plate to stabilize the support plate.

9. The adjustable mirror assembly of claim 6, wherein the mirror housing is configured to receive more than one mirror unit.

10. The adjustable mirror assembly of claim 9, wherein at least one additional mirror is mounted in the mirror housing and wherein the at least one additional mirror comprises a motorized mirror adjustment mechanism.

11. The adjustable mirror assembly of claim 10, wherein at least one mirror further comprises an in-line mounted camera mounted therewith, and wherein adjustment of the viewing angle of the mirror also adjusts the viewing angle of the camera.

12. The adjustable mirror assembly of claim 6, wherein the housing comprises an internal pressure mount, an external bar clamp for fastening the mirror housing to a bar, at least one screw, and at least one screw aperture, and wherein the internal pressure mount is fastened to the external bar clamp threw the screw aperture by use of the screw.

13. The adjustable mirror assembly of claim 12, wherein the pressure mount further comprises at least one spring to provide frictional pressure for the pressure mount, and wherein the spring provides for manual adjustment of the mirror housing through the use of force.

14. The adjustable mirror assembly of claim 1, wherein the hemispherical cup and the mirror support are fastened to the support plate using at least one star spring washer and a screw.

15. The adjustable mirror assembly of claim 14, wherein the support plate includes a post and the star spring washer is fastened to the post against the hemispherical cup using the screw.

16. The adjustable mirror assembly of claim 1, wherein the support plate includes a peripheral rib configured to keep adjustment of the mirror lens from interferences.

17. The adjustable mirror assembly of claim 1, wherein the mirror support includes a set of ribs; wherein the support plate includes a set of receiving sections configured to receive the set of ribs; and wherein the ribs are configured to prevent free mirror rotation beyond the support plate's inner boundary.

18. The adjustable mirror assembly of claim 1, wherein the mirror further comprises an in-line mounted camera mounted therewith, and wherein adjustment of the viewing angle of the mirror also adjusts the viewing angle of the camera.

19. The adjustable mirror assembly of claim 1, further comprising a lubricating agent deposited between at least one of the hemispherical cup and the first hemispherical cavity, and between the first hemispherical cavity and the second hemispherical cavity.

20. An adjustable mirror assembly comprising:
a mirror support having a first hemispherical cavity formed therein and at least one rib protruding a predetermined distance therefrom;

a support plate having a second hemispherical cavity, a connection post having an attachment receiving aperture and protruding from the second hemispherical cavity, at least one receiving section to receive the at least one rib, the second hemispherical cavity receiving the first hemispherical cavity of said mirror support;

at least one attachment device frictionally and rotationally securing said mirror support and said support plate; and a mirror lens configured to be mounted on said mirror support over said at least one attachment device.

21. The adjustable mirror assembly of claim 20, wherein the second hemispherical cavity is configured to engage parts of the first hemispherical cavity.

22. The adjustable mirror assembly of claim 20, wherein the support plate is fastened to a mirror housing.

23. The adjustable mirror assembly of claim 22, wherein the mirror housing is configured to receive more than one mirror unit.

24. The adjustable mirror assembly of claim 23, further comprising at least one additional mirror mounted in the mirror housing and wherein the at least one additional mirror comprises a motorized mirror adjustment mechanism.

25. The adjustable mirror assembly of claim 24, wherein at least one mirror further comprises an in-line mounted camera mounted therewith, and wherein adjustment of the viewing angle of the mirror also adjusts the viewing angle of the camera.

26. The adjustable mirror assembly of claim 20, wherein the mirror support includes a set of grooves and the support plate includes a set of guides and wherein the guides are configured to engage the grooves.

* * * * *